April 19, 1966  E. J. STEALY  3,246,679
COMBINATION VALVE AND PRESSURE GAUGE
Filed Nov. 12, 1963
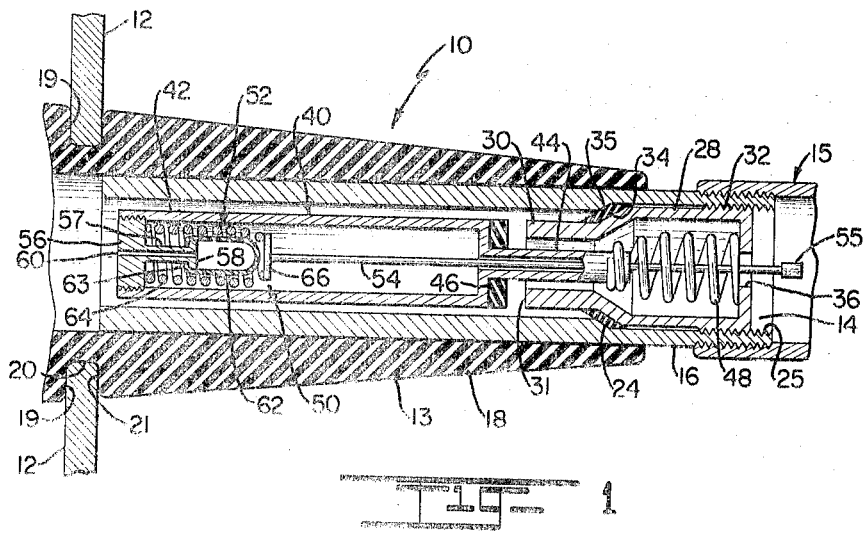
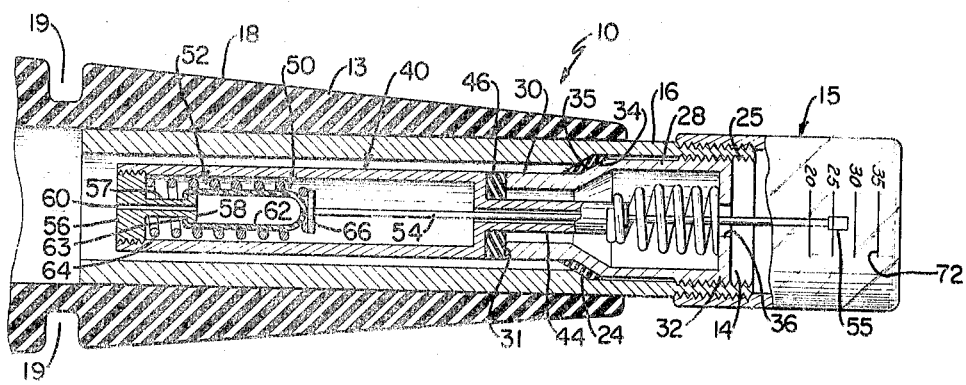
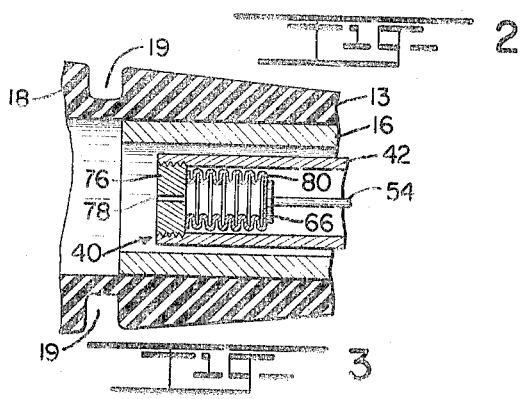
INVENTOR.
EDWARD J. STEALY
BY John E. Reilly
ATTORNEY United States Patent Office 3,246,679
Patented Apr. 19, 1966

3,246,679
COMBINATION VALVE AND PRESSURE GAUGE
Edward J. Stealy, Quarters 4150, United States Air Force Academy, Colo.
Filed Nov. 12, 1963, Ser. No. 322,991
7 Claims. (Cl. 152—427)

This invention relates to a novel and improved valve assembly incorporating a pressure gauge which is adaptable for attachment to various articles or vessels under presure for the purpose of controlling and indicating pressure levels therein; and more particularly relates to a combination valve and pressure gauge unit being specifically adapted for use in pneumatic tires to afford a ready and accurate means of indicating increases or decreases in tire pressure, while at the same time controlling the admission and release of air to and from the tire.

It is customary to check the pressure level in pneumatic tires through the use of a separate tire gauge which by releasing air from the tire through the valve will measure and indicate the pressure level. It has been proposed to eliminate the tire gauge as a special attachment and instead to form it as a permanent part of the valve structure; however, conventionally this has been done by positioning the gauge element exteriorly of the valve thereby necessitating modification or enlargement of the valve stem and valve structure, and in many cases causing weight imbalance of the tire when running. Indicating devices have also been devised for disposition interiorly of the valve assembly, but none to the best of my knowledge and belief will afford a constant indication of increases or decreases in pressure level. Moreover, such structures have required modification of the valve stem itself so as not to be easily interchangeable for use either in conventional tubeless or tube-type tires.

In accordance with the present invention, it is desirable to provide a pressure gauge which in combination with the valve structure may be mounted and positioned entirely within conventional valve stems used for pneumatic tires and with the gauge elements being positioned inwardly of the valve structure in such a way as to be highly sensitive to pressure changes within the tire at all times. This of course necessitates a gauge structure which is sufficiently compact that it can be contained wholly within the valve stem in order to be protected against damage and so as not to introduce imbalance or interfere with inflation or deflation of the tire through the valve structure. In this way, also, the gauge structure is protected from the entry of dust or foreign matter and is highly sensitive to pressure changes so as to provide a constant and accurate indication of pressure level and changes in pressure within the tire.

It is therefore a principal object of the present invention to provide for a new and improved means for indicating pressure changes in a pneumatic tire or the like and which is both compact and inexpensive in construction while being conformable for interchangeable use as part of a conventional valve assembly either for tubeless or tube-type tires.

It is another object of the present invention to provide for a novel and improved valve assembly for a pneumatic tire incorporating a pressure gauge which eliminates the use of special pressure gauge attachments and obviates positioning of the gauge elements exteriorly of the valve structure; furthermore, to devise a pressure gauge which in association with a valve structure can be located wholly within the valve stem to provide a ready, accurate means of indicating pressure changes in the tire.

It is a further object of the present invention to provide for a valve structure incorporating a pressure gauge in association therewith requiring a minimum number of parts and which is inexpensive to fabricate while being compact and reliable in use; moreover, to provide for a valve structure of the type described which can be interchangeably used as the valve core for conventional valve stems on inflatable tubeless or tube-type tires, without affecting the imbalance or normal running characteristics of the tire.

It is an additional object of the present invention to provide for a valve assembly for pneumatic tires and other inflatable articles of manufacture incorporating a pressure gauge as a part thereof and which gauge structure is located inwardly of the valve element within the valve stem or casing and will cooperate with the valve in effecting opening and closing thereof without affecting the responsivity of the gauge to changes in pressure conditions within the tire.

The above and other objects, advantages and features of the present invention will become more readily understood and appreciated from a consideration of the following detailed description, when taken together with the accompanying drawings, in which:

FIGURE 1 is a sectional view of one form of pressure gauge and valve assembly in attached relation to a tubeless tire and illustrating the relative disposition and arrangement between parts when the tire is being inflated.

FIGURE 2 is a sectional view showing the valve assembly illustrated in FIGURE 1 with the valve in closed position and a valve cap attached over the valve stem.

FIGURE 3 is a fragmentary sectional view showing the relative disposition and arrangement between parts of a modified form of pressure gauge structure for use in a tire valve of the type illustrated in FIGURES 1 and 2.

Referring in more detail to the drawings, there is shown by way of illustrative example in FIGURES 1 and 2 a valve assembly 10 in attached relation to a tire rim 12 for a pneumatic tire of the tubeless type. Here, the valve assembly is broadly comprised of a valve stem 13, a valve core 14 and a valve cap 15, the latter being shown in FIGURE 2. In accordance with conventional practice, the valve stem 13 is comprised of an elongated hollow casing 16 having an outer conical rubber-like sleeve 18 provided with an annular groove 19. To position the valve stem in the tire rim the stem is forced outwardly through opening 20 in the rim and with the groove 19 receiving the surrounding edge 21 of the rim opening in order to hold the valve stem securely in position.

The casing 16 is formed to define a main passage for mounting and disposition of the valve core 14 in direct communication with the interior of the tire, and for this purpose the casing has an internal shoulder 24 together with internal threading 25 at its outer extremity. The valve core 14 in turn includes a hollow cylindrical valve element 28 including a reduced inner end 30 provided with a flat annular seating surface 31. The valve element is externally threaded at its outer extremity 32 for engagement with the internal threading 25, and an external shoulder surface 34 is provided with a rubber washer 35 which upon threaded engagement of the valve element within the casing will move into sealed relation against the internal shoulder 24 of the casing. A central opening 36 is formed at the outer extremity 32 in communication with the hollow interior of the valve for the selective passage of air into the tire in a manner to be described.

Positioned inwardly of the valve element and in spaced inner concentric relation to the casing 16 is a valve control means 40 including the pressure gauge structure of the present invention. Preferably, the valve control means includes an elongated tube or housing 42 of a diameter and wall thickness generally corresponding to that of the inner end 30 of the valve element. Additionally, the tube 42 terminates at its outer end in a tubular extension 44 of reduced diameter which projects outwardly through the hollow interior of the valve element in axially aligned relation to the central opening 36. An annular valve seat 46 of suitable rubber or rubber-like composition is positioned over the tubular extension 44 against the end surface of the housing 42 in facing relation to the flat seating surface 31 of the valve element; and opposite ends of spring 48 are positively connected to the outer end of extension 44 and the outer extremity 32, respectively, the spring 48 being biased to normally urge the valve seat 46 into closed position against the seating surface 31. It will be seen that the valve is opened, as shown in FIGURE 1, by forcing the valve seat 46 away from the valve element so that communication is established with the interior of the tire for the passage of air through the valve element 28, the clearance space formed between the seating surfaces and through the space formed between the valve control means 40 and casing 16. Since the valve element is positioned in sealed relation to the casing 16 along the shoulder 24, when the valve seat 46 returns to sealed relation against the seating surface 31, as shown in FIGURE 2, the entire valve assembly will be closed to prevent escape of air from the tire.

In order to afford a constant indication of increases or decreases in pressure of the tire or in other words to indicate its pressure level, the valve control tube 42 encloses a pressure gauge structure 50. Broadly, the gauge structure is comprised of pressure responsive means 52 disposed at the inner end of the tube in direct communication with the interior of the tire, and a plunger rod 54 associated with the pressure responsive means 52 extends axially through the tube 42, tubular extension 44 and the valve element to terminate just exteriorly of the valve stem. The pressure responsive means 52 is designed to undergo lengthwise expansion and contraction for a distance corresponding to increases and decreases, respectively, of the pressure level within the tire and to translate such movement directly to the plunger for corresponding movement of the outer indicator end 55 of the plunger with respect to the outer end of the valve stem. For this purpose, the pressure responsive means 52 consists of a threaded end cap 56 attached to the inner extremity of the tube 42 which has an inwardly extending stem portion 57 with an enlarged extremity 58 and a central bore 60 extending through the cap and stem. An expansible and contractible elastic diaphragm or inflatable element 62 is provided with a limited opening 63 at one end for placement over the enlarged extremity 58 of the end cap to establish direct communication between the interior of the tire through the central bore 60 with the interior of the diaphragm 62. By forming the diaphragm 62 to be of somewhat elongated configuration and with a high modulus of elasticity it will have the characteristic of longitudinally expanding and contracting a limited extent in direct relation to any variations in pressure conditions in the tire. In addition, a spring 64 is mounted under compression in surrounding relation to the stem 57 and diaphragm 62 with the inner end of the spring attached to the end surface of the cap 56 and the opposite end being attached to a transverse end plate 66 at the inner extremity of the plunger rod 54. In this relation, the spring 64 will yieldingly urge the end 66 of the plunger rod inwardly against the diaphragm 62 so that the plunger rod will directly follow the movement of the diaphragm either under expansion or contraction; and the outer end 55 of the plunger will accordingly project outwardly from the valve stem a distance corresponding to the pressure level in the tire.

In practice, the tire may be inflated in a conventional manner through the valve stem by depressing the plunger rod 54 and which will act through the spring 64 and tube 42 to force the valve seat 46 inwardly away from engagement with the valve element and permit air to enter under pressure into the tire. Upon release, the valve seat 46 will of course return to closed relation against the valve element 28, and at the same time the indicator end 55 of the plunger rod will be advanced outwardly through the valve stem for a distance corresponding to the lengthwise expansion of the diaphragm 62. As will be seen from FIGURE 2, a valve cap 15 composed of a clear plastic material may be threaded onto the valve stem and has surface markings 72 with numbers opposite the markings which are calibrated to correspond with the degree of expansion of the diaphragm and pressure level in the tire so that the disposition of the indicator end 55 relative to the markings will provide a visual indication of the pressure within the tire. Alternately, a scale may be placed directly upon the surface of the plunger rod adjacent to its outer end 55 whereby alignment of the surface markings on the plunger rod oppoist the outer edge of the valve stem will provide an indication of pressure. Of course, various means may be employed to serve as a visual indication of tire pressure, the important feature of this invention residing in the manner in which the plunger rod is controlled through the pressure responsive means to reflect increases or decreases in pressure level.

In FIGURE 3, a modified form of pressure gauge structure is illustrated for use as part of the valve core assembly shown in FIGURES 1 and 2 and wherein like parts are correspondingly enumerated. The modification resides in the use of an end cap 76 which is generally disk-shaped and externally threaded for attachment to the inner end of the valve control housing 42. A central bore 78 of limited diameter extends axially through the end cap and a spring-reinforced bellows 80 is attached to the end surface of the end cap and projects through the interior of the control element with the opposite end of the bellows being attached to the end plate 66 of the plunger rod. The bellows will in a manner corresponding to that described with reference to the diaphragm 62 undergo lengthwise expansion and contraction in direct response to pressure changes within the tire and is reinforced with a spring element which will normally be under compression so as to yieldably urge the plunger rod in a direction tending to contract the bellows against the pressure expanding the bellows. Of course, the operation of the valve assembly is the same and the bellows operates in the same manner as the combination diaphragm and spring in FIGURES 1 and 2 to control movement of the plunger rod through the valve core assembly.

It will be evident from the foregoing description of alternate forms of the present invention that a vastly improved valve assembly and gauge have been devised, and which may be substituted for any of the conventional valve cores for disposition within the valve stem not only to control tire inflation but also to provide a ready, accurate and highly sensitive means of indicating either increases or decreases in pressure level within the tire. Since the pressure gauge is fully contained within the valve stem inwardly of the valve it is protected from damage while at the same time will cooperate with the valve structure in controlling inflation or deflation of the tire through the valve stem. It is to be understood that various changes and modifications may be made in the construction and arrangement of parts comprising the alternate forms of valve assemblies of the present invention without departing from the spirit and scope thereof as defined by the appended claims.

What is claimed is:

1. A valve assembly for use in an inflatable tire and the like, said valve assembly comprising in combination a casing forming a passage to establish communication with the interior of the tire, a valve core disposed in the passage including valve means being movable between a normally closed position and an open position to control the flow of air through the passage to and from the tire, inflatable pressure responsive means being disposed inwardly of said valve means and being responsive to variations in air pressure within the tire to undergo limited longitudinal movement according to such pressure changes, a plunger element extending longitudinally through said passage and through said valve means, said plunger being associated with said inflatable pressure responsive means to follow the longitudinal movement thereof, and pressure indicating means disposed outwardly of said valve means between said plunger and casing for following the longitudinal movement of said plunger in relation to said casing to indicate the pressure level within the tire.

2. A valve assembly for an inflatable tire and the like comprising a valve stem having a passage to establish communication with the interior of the tire for inflation thereof, valve means disposed in the passage and axially movable between a normally closed position and an open position to control the flow of air through the passage to and from the tire, inflatable pressure responsive means being disposed inwardly of said valve means to undergo limited longitudinal movement in response to changes in pressure level within the tire, and a plunger extending longitudinally through the passage and through said valve means, said plunger being movable independently of said valve means to follow limited longitudinal movement of said pressure responsive means, and said plunger being further manually depressable in an inward direction to urge said valve means from the normally closed position to the open position, and pressure indicating means disposed outwardly of said valve means for indicating the pressure level within the tire in accordance with the longitudinal movement of said plunger.

3. A valve assembly for an inflatable tire and the like comprising a valve stem having a longitudinal passage therein to establish communication with the interior of the tire, valve means disposed in the passage and axially movable between a closed position and an open position to control the flow of air through the passage to and from the tire, said valve means including valve control means normally biasing said valve means to the closed position, pressure responsive means being disposed inwardly of said valve means to undergo limited longitudinal movement in response to changes in pressure level within the tire, and a plunger extending longitudinally through the passage and through said valve means, said plunger being movable independently of said valve means to follow limited longitudinal movement of said pressure responsive means, pressure indicating means disposed outwardly of said valve means between said plunger and valve stem for indicating the pressure level within the tire in accordance with the longitudinal movement of said plunger in relation to said valve stem and said plunger being further movable inwardly to overcome the biasing of said valve control means whereby to selectively urge said valve means to the open position for the passage of air therethrough.

4. A valve assembly according to claim 3, said pressure-responsive member being defined by a spring-reinforced bellows communicating with the interior of the tire, and the inner end of said plunger being secured to said bellows to follow the movement of said bellows under expansion and contraction.

5. A valve assembly for a tubeless tire mounted on a wheel rim comprising: a valve stem forming a passage in communication with the interior of the tire; a valve element positioned in sealed relation within the passage including a longitudinal opening therein and an annular valve seating surface; valve control means including a tubular housing disposed in spaced inner concentric relation within the passage inwardly of said valve element having an annular valve seat at its outer end arranged in facing relation to said valve seating surface and a tubular extension projecting outwardly from said valve seat through the opening in said valve member, an inflatable element disposed across the inner end of said housing having an opening in communication with the interior of the tire and being adapted to undergo longitudinal expansion and contraction through the housing in response to changes in air pressure within the tire, a plunger extending longitudinally through the opening in said valve element and through said tubular extension into said housing, said plunger having its inner end abutting said inflatable element whereupon said plunger is movable lengthwise through said passage in response to expansion and contraction of said inflatable element, pressure indicating means being disposed outwardly of said valve element between said plunger and said casing to provide a visual indication of increases and decreases in pressure level within the tire in accordance with the longitudinal movement of said plunger in relation to said casing, and means between said tubular extension and said valve member biasing said valve seat into closed relation against the seating surface, said valve seat being movable away from said valve seating surface upon depression of said plunger against the inner end of said housing to admit and release air to and from the tire through the opening in said valve element.

6. A valve assembly according to claim 5 being further characterized by biasing means between the inner end of said plunger and said housing yieldably urging the inner end of said plunger against said inflatable element.

7. A valve assembly according to claim 5, said inflatable element being defined by a spring-reinforced bellows interposed between the inner end of said plunger and the inner end of said housing with a limited opening establishing communication between the interior of the tire and said bellows.

References Cited by the Examiner
UNITED STATES PATENTS

| | | | |
|---|---|---|---|
| 1,405,436 | 2/1922 | Pulverman | 152—429 X |
| 1,856,199 | 5/1932 | Tagle et al. | 137—227 X |
| 2,167,456 | 7/1939 | Hooper | 116—34 |
| 2,915,035 | 12/1959 | Russell | 116—34 |

ARTHUR L. LA POINT, *Primary Examiner.*